United States Patent [19]

Winters

[11] 4,084,358
[45] Apr. 18, 1978

[54] GRAIN STORAGE APPARATUS

[75] Inventor: Raymond S. Winters, La Grange, Ill.

[73] Assignee: Environetics, Inc., Bridgeview, Ill.

[21] Appl. No.: 725,940

[22] Filed: Sep. 23, 1976

[51] Int. Cl.² ............................................. E04D 1/34
[52] U.S. Cl. ........................................... 52/4; 52/63; 52/222
[58] Field of Search .................. 52/3, 4, 63, 193, 2, 52/222, 5, 273; 150/1, .5; 135/DIG. 8, 1 R; 296/100

[56] References Cited

U.S. PATENT DOCUMENTS

| 2,730,150 | 1/1956 | Wunderwald et al. | 52/4 |
| 2,837,101 | 6/1958 | Bary | 52/2 |
| 2,889,171 | 6/1959 | Morris | 296/100 |

FOREIGN PATENT DOCUMENTS

| 550,885 | 1/1943 | United Kingdom | 52/4 |

Primary Examiner—Ernest R. Purser
Assistant Examiner—Carl D. Friedman
Attorney, Agent, or Firm—Roy E. Hofer; Gary M. Ropski

[57] ABSTRACT

An improved storage apparatus for dry material in bulk is disclosed. The storage apparatus includes a tarpaulin cover and a circular metal wall. The tarpaulin cover is secured to the circular metal wall, or to any suitable surface, by a lashing means including a plurality of eyelets in the periphery of the tarpaulin cover, a plurality of anchors attached to the wall or, alternatively, to any suitable surface, a first cable attached to the anchors so as to encircle the wall, and a second cable alternately threaded through the eyelets and around the first cable.

According to another embodiment there is provided a storage container which includes a flexible membrane cover and a flexible membrane base. Alternatively, the flexible membrane cover is provided separately for a pile of dry material in bulk. In these embodiments the flexible membrane cover is secured to any suitable surface utilizing the lashing means described above.

11 Claims, 6 Drawing Figures

GRAIN STORAGE APPARATUS

BACKGROUND OF THE INVENTION

This invention rlates generally to a storage apparatus for dry material in bulk, and specifically, to an apparatus for easily, conveniently, and inexpensively storing and protecting large quantities of grain outdoors.

It is often necessary to store grain and other dry material in bulk form in quantities that may at times exceed the permanent storage capacity available. For instance, an abundant harvest one year may produce an overflow of grain which would not fit into a farmer's silo or other permanent storage system. Exposing the grain to the environment for long periods of time may produce detrimental results such as removal of the grain by wind, rain, animal, or other natural forces, fungus and bacterial infection, and contamination with other materials. For these reasons it is desirable to devise alternatives to simply piling the grain on an open, uncovered data of farmland.

In the past most alternatives involved the construction of auxiliary permanent storage structures or temporary structures which are easily assembled and dismantled. Permanent structures are undesirable because of their expense. Typical temporary structures, which are less costly, have been assembled from sheets of corrugated metal, arranged and connected so as to form a circular storage area. The grain is then loaded into the enclosed area within the wall. After a grain pile of desired height and shape has been provided, the pile is covered with a lightweight but waterproof material, such as a tarpaulin.

In many cases, the efectiveness, durability, lifetime and cost of the temporary storage structure is determined by the means by which the tarpaulin is attached to the circular wall or, alternatively, to the surface of the surrounding farmland. The tarpaulin must be attached so that it continues to shield the grain pile in the most demanding weather conditions. The stresses on the tarpaulin must be distributed to the supporting anchors so as to place a minimum of tensile strain on any one area of the tarpaulin. Otherwise, the tarpaulin will tear from its supports, expose the grain pile to the damaging effects of surrounding environment, and increase the possibility of further injury to the tarpaulin, for instance, by the flapping of a loose tarpaulin edge against the circular wall.

The typical means of attaching the tarpaulin, with cables running directly from the tarpaulin to surface anchors, has not proved sufficient to stabilize the tarpaulin, especially in high winds, and still disperse the supporting stresses over a sufficient number of points so as to minimize the possibility of tarpaulin tearing and deterioration. The large size of most circular bins (at least up to 100 feet in diameter) has usually required a substantial increase in the number of surface anchors and auxiliary hardware required to secure the tarpaulin, thus increasing the costs of such apparatus prohibitively.

SUMMARY OF THE INVENTION

It is the primary object of the invention to provide an apparatus for storing dry material in bulk at a low cost, effectively, and with the ability to withstand strong wind and other damaging environmental conditions.

It is another object of the invention to provide an apparatus which uses a minimal amount of auxiliary hardware in providing the effective, cheap, and secure means of storing dry material in bulk. It is a further object of the invention to provide an apparatus which can easily be set up, dismantled, removed, and stored.

The objects set forth above are achieved in an apparatus which includes a circular tarpaulin stretched over a circular corrugated metal wall. The tarpaulin is attached directly to the wall with a lashing means comprising a plurality of eyelets in the peripheral edge of the tarpaulin, a plurality of anchors attached to the wall, a first cable attached to the anchors so as to encircle the covered storage area, and a second cable alternately threaded through the eyelets and around the first cable.

Alternatively, the anchors can be attached to any suitable surface and the same apparatus is used to lash the tarpaulin to the anchors as described above. The apparatus for lashing the tarpaulin minimizes the number of anchors required, while at the same time allowing the stresses to be distributed more fully along the tarpaulin by the use of a second cable which secures the tarpaulin to the first cable.

According to another embodiment there is provided a storage container which includes a flexible membrane cover and a flexible membrane base. The use of this cover and base provides a grain storage structure less expensive then the conventional apparatus comprising a separate corrugated metal wall and synthetic membrane cover tarpaulin. The storage container is secured to any suitable surface by utilizing the lashing means described above.

According to a further embodiment, there is provided a cover for a pile of dry material resting in bulk form directly on a surface. This cover is secured to any suitable surface by the lashing means described above, and is used where it is not necessary to contain the pile of dry material with a wall or other base support.

DESCRIPTION OF THE DRAWINGS

The apparatus of this invention will be better understood by reference to the accompanying drawings in which.

DETAILED DESCRIPTION OF THE INVENTION

Figure 1:
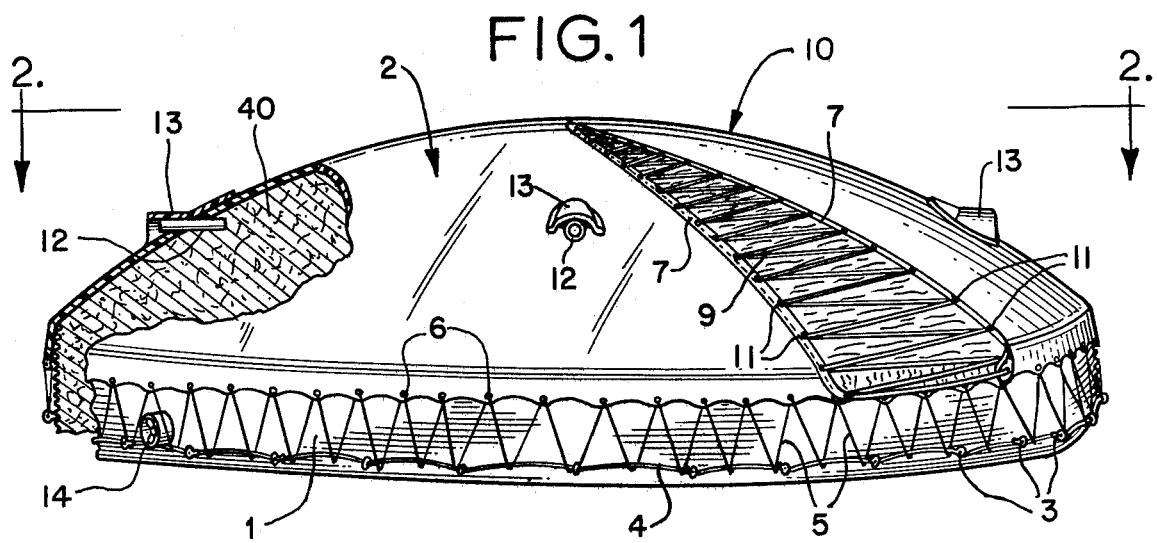
FIG. 1 is a side perspective view of a storage apparatus utilizing the present invention, illustrating a tarpaulin cover and circular corrugated metal walls.

Referring now to the drawings, and more particularly to FIGS. 1-4, there is illustrated a storage apparatus embodying the features of the present invention and indicated generally by reference numeral 10. The storage apparatus 10 includes a pile of dry material in bulk 40 surrounded by a circular metal wall 1 and covered by a tarpaulin 2. The tarpaulin 2 is lashed to the wall 1 by means of a first cable 4 and a second cable 5. The shoelace cable 9, which is threaded through fold eyelets 11 in radial folds 7 of the tarpaulin 2, is used to adjust the surface tension of the tarpaulin 2 to keep it fitted tightly on the surface of the dry material in bulk 40 and around wall 1.

Figure 2:
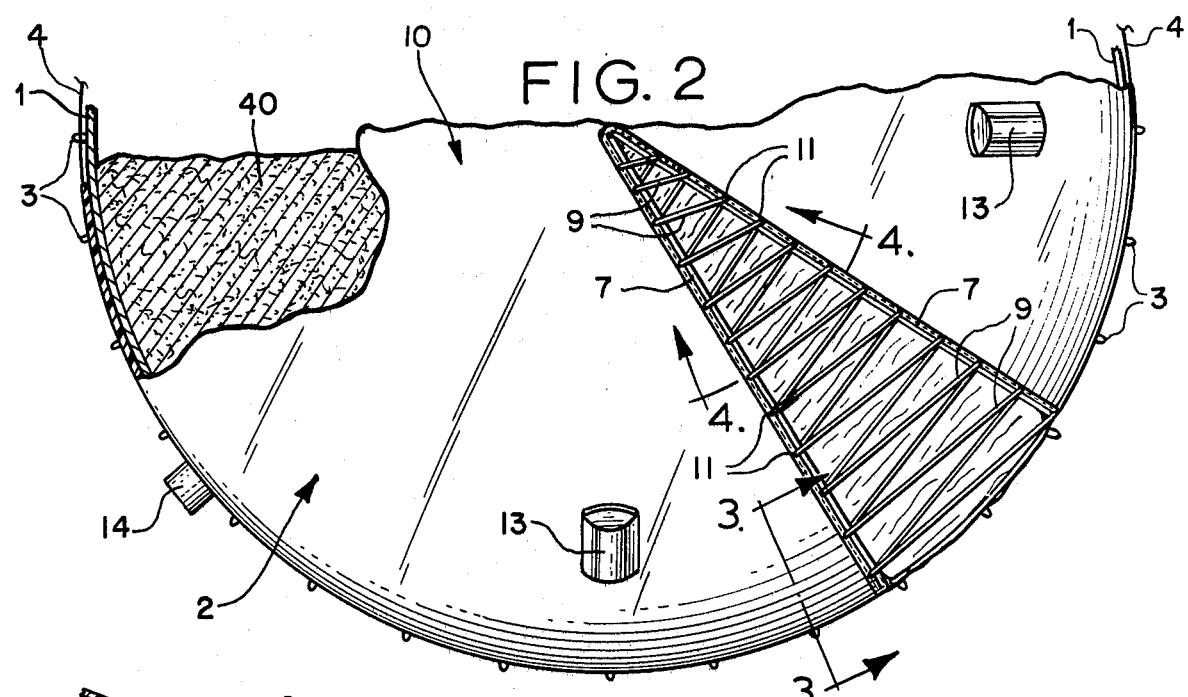
FIG. 2 is a partial top plan view of the storage apparatus of FIG. 1 taken across 2—2 and further illustrating the tarpaulin cover.

Referring to FIGS. 1 and 2, the tarpaulin 2 is shown resting on the pile of dry material on bulk 40. Eyebolts 3 are attached to the periphery of the wall 1 and a first cable 4 is threaded through the eyebolts in sequence so as to make a full circuit around the periphery of the wall 1. Alternatively, first cable 4 could be threaded directly through surface anchors (not shown) around the periphery of the storage area. The eyebolts 3 are preferably attached near the base of the wall 1 to provide a range in which the tension in second cable 5 can be adjusted to keep the tarpaulin 2 properly fitted over the dry material in bulk 40. If surface anchors are used, they are preferably positioned away from the wall at a distance approximately equal to the height of the wall, so that the first cable 4 exerts a force upon the surface anchors at about 45° from the plane of the surface.

Figure 3:
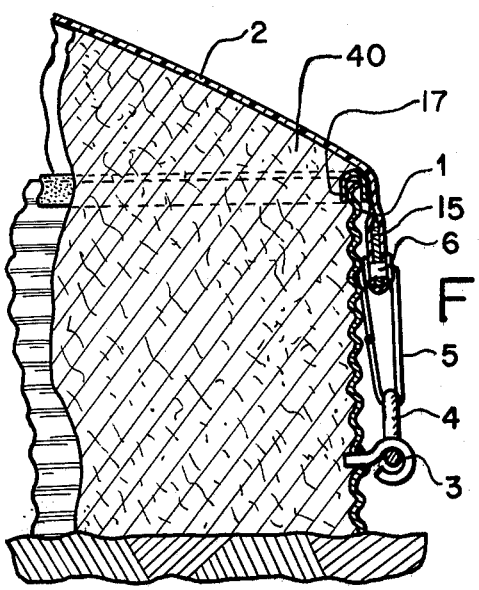
FIG. 3 is a partial side cross-sectional view of the storage apparatus of FIG. 2 taken across 3—3 and furter illustrating the apparatus for lashing the tarpaulin.

As is illustrated in FIG. 3, a periphery strap 15 is inserted into a fold along the periphery of tarpaulin. Periphery eyelets 6 are provided, preferably at approximately 3-foot intervals, in the periphery strap 15 and the adjoining tarpaulin 2. The periphery strap 15 reinforces the periphery of the tarpaulin 2 and distributes the offloading forces from a second cable 5, which has been threaded alternately through the periphery eyelets 6 and around the first cable 4. This alternate threading process is preferably followed until the second cable 5 also makes a full circuit around the periphery of the wall 1. U-shaped channel 17 protects the tarpaulin 2 from possible abrasion as tarpaulin 2 moves over the top of wall 1 during positioning and wind stresses.

Instead of the periphery strap 15 with periphery eyelets 6, any suitable means can be used to provide a reinforced opening to receive second cable 5. For instance, a periphery cable (not shown) could be inserted into a periphery fold made along the periphery of tarpaulin 2, and slits provided at intervals in the periphery fold. The second cable would be laced through the slits and around the periphery cable instead of through the periphery eyelets 6.

Additionally, other suitable means could be used in place of a single second cable 5 to attach the periphery of the tarpaulin 2 to the first cable 4, such as a plurality of connectors (not shown) between periphery eyelets 6 and first cable 4. The connectors are preferably flexible so that they stretch or contract in response to temporary stresses which are exerted upon the tarpaulin by external forces such as the wind. The second cable 5 is similarly responsive because if it is not flexible, the second cable 5 preferably rides freely around the first cable 4 and through the periphery eyelets 6. Such suitable flexible connectors are elastic cables with hooks at both ends.

Figure 4:
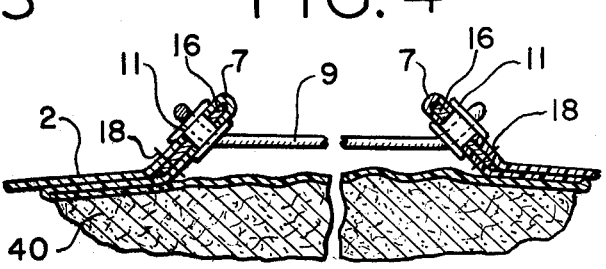
FIG. 4 is a partial side cross-sectional view of the storage apparatus of FIG. 2 taken across 4—4 and further illustrating the means for adjusting the tension in the tarpaulin.

The tarpaulin 2 is provided with radial folds 7, the sides of which have been stitched or otherwise joined at the location indicated by reference numeral 18 after the fold straps 16 have been inserted into the radial folds 7, as illustrated in FIG. 4. Eyelets 11 are provided in the radial folds 7 and fold straps 16 to accept shoelace cable 9 which is threaded in a criss-cross fashion across the radial folds 7.

In the process of assembling the tarpaulin 2 onto and above the wall 1, the cover is first positioned over the completed pile of dry material in bulk 40 and then snugged up around the wall 1 by the shoelace cable 9. Then the first cable 4 is threaded through the eyebolts 3 and made taut.

After the first cable 4 has been attached, the second cable 5 is threaded alternately through the periphery eyelets 6 and around the first cable 4 and then back through the periphery eyelets 6, with tension being gradually applied during the threading process until the entire peripheral edge of the tarpaulin 2 has been lashed to the first cable 4. The second cable 5 and shoelace cable 9 are then made taut. In this manner a waterproof seal is effected above and around the pile of dry material in bulk 40. Although the dry material is typically resting directly on the underlying farmland within the wall 1, a complete waterproof seal can be obtained by providing a liquid impermeable liner or base for the wall 1 before forming the dry material pile in bulk 40.

Preferably, tarpaulin 2 is constructed from a strong, inert synthetic membrane, such as a thermoplastic. Although a number of materials can be used, it has been determined that at a minimum the tarpaulin should be strong and durable, should be liquid impermeable, should be effective at low temperatures and should have effective elongation, tear strength, and cold crack characteristics.

Because the storage apparatus is often used for freshly harvested grain, typically having a 15% moisture content, it is desirable to dry the grain while it is being stored. For purposes of ventilation, a fan 14 is mounted in the wall 1 to either impel or expel air in the dry material 40. If the tarpaulin 2 is both air and liquid impermeable, pipe vents 12 and protective weather flaps 13 should be provided. Such an acceptable air and liquid impermeable tarpaulin material is a type of woven fiber, lightweight oriented polyolefin, with a thickness of 0.005 inches, a weight of 3 ounces per square yard, and the following physical properties:

TABLE 1

PROPERTIES OF GAS IMPERMEABLE TARPAULIN MATERIAL

| | Physical Values | Test Methods |
|---|---|---|
| Tensile Strength (lbs./in.) | | |
| Machine direction | 90 | ASTM D 1682-64 |
| Transverse direction | 90 | ASTM D 1682-64 |
| Tear strength (lbs.) | 65 | ASTM 2261-71 |
| Temperature | Low, −60° F Shrinks at 180° F | |

One especially preferred tarpaulin material, because it is gas permeable while remaining liquid impermeable, is a spun polyester base fabric coated with urethane with a thickness of 0.015 inches and a weight of 7 ounces plus or minus ½ ounce per square yard. The exposed side of this material is 100% urethane, and the backside is 100% spun polyester. This material, having the following mechanical properties, eliminates the necessity for pipe vents 12 and weather flaps 13:

TABLE 2
PROPERTIES OF GAS PERMEABLE TARPAULIN MATERIAL

| | Physical Value |
|---|---|
| Tensile Strength | Warp 200, Fill 150 |
| Tear Strength | Warp 16, Fill 21 |
| Water Shrinkage Maximum | ½ of 1% |
| Leakage | None |
| Spray Rating | 100 |
| Temperature | Low, −60° F |

The tarpaulin 2 is fabricated in different sizes to properly cover the circular metal wall 1. Typical diameters of the circular wall 1 are 40, 60, 80 and 100 feet with wall heights of 6 and 8 feet. These different sizes provide for from approximately 20,000 to 100,000 bushel storage capacites. Corresponding tarpaulin diameters for the above-mentioned wall sizes are 46 feet, 68 feet, 90 feet and 112 feet. These diameters allow the tarpaulin 2 to rest on the dry material in bulk 40 at the approximately 20° to 25° angle of repose of the dry material for optimum drainage and capacity.

The periphery eyelets 6 and fold eyelets 11 are preferably standard brass spur-type grommets. The periphery strap 15 and fold straps 16 are made from nylon or a similar strong but flexible material, approximately 1/16-inch thick and 2 inches wide, with a breaking strength of 2200 pounds. The first cable 4 is ⅜-inch diameter polypropylene rope with a breaking strength of 2700 pounds, and the second cable 5 is ¼-inch diameter polypropylene rope with a breaking strength of 1250 pounds. Straps and cables of similar strengths are, of course, interchangeable.

Although both the first cable 4 and second cable 5 have been described as each being one-piece cables, they could alternatively be replaced by a series of shorter cables. For instance, the shorter cables which might comprise first cable 4 could be attached in sequence to the periphery eyebolts 3 of anchors 20. Also, second cable 5 might comprise a plurality of shorter cables, each lashing a quadrant of the tarpaulin 2 to first cable 4. In this manner, if one of the shorter cables should break, part of the tarpaulin would remain secured.

Figure 5:
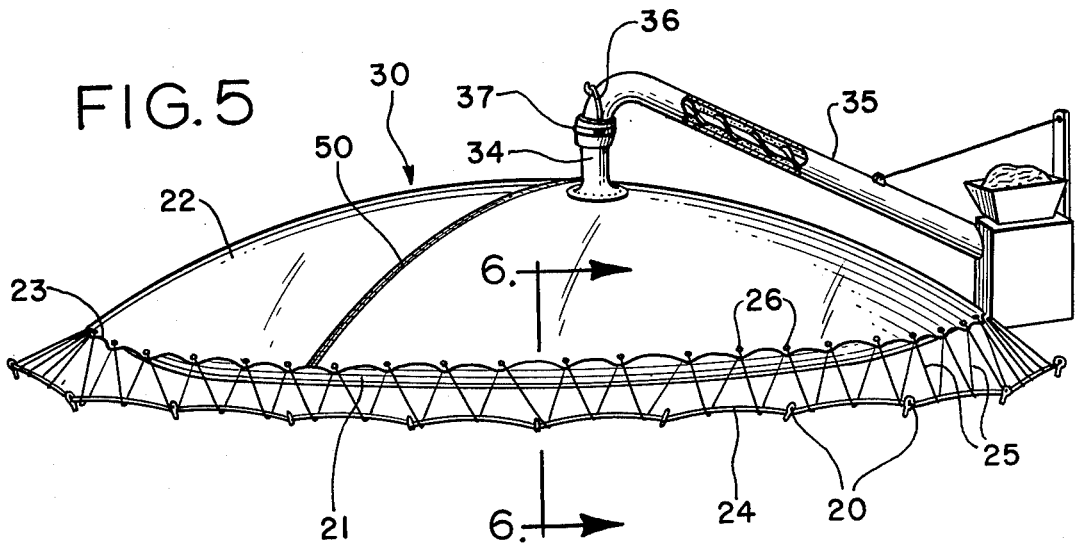
FIG. 5 is a side perspective view of a storage apparatus utilizing another embodiment of the invention, illustrating a flexible membrane cover and a flexible membrane base.
Figure 6:
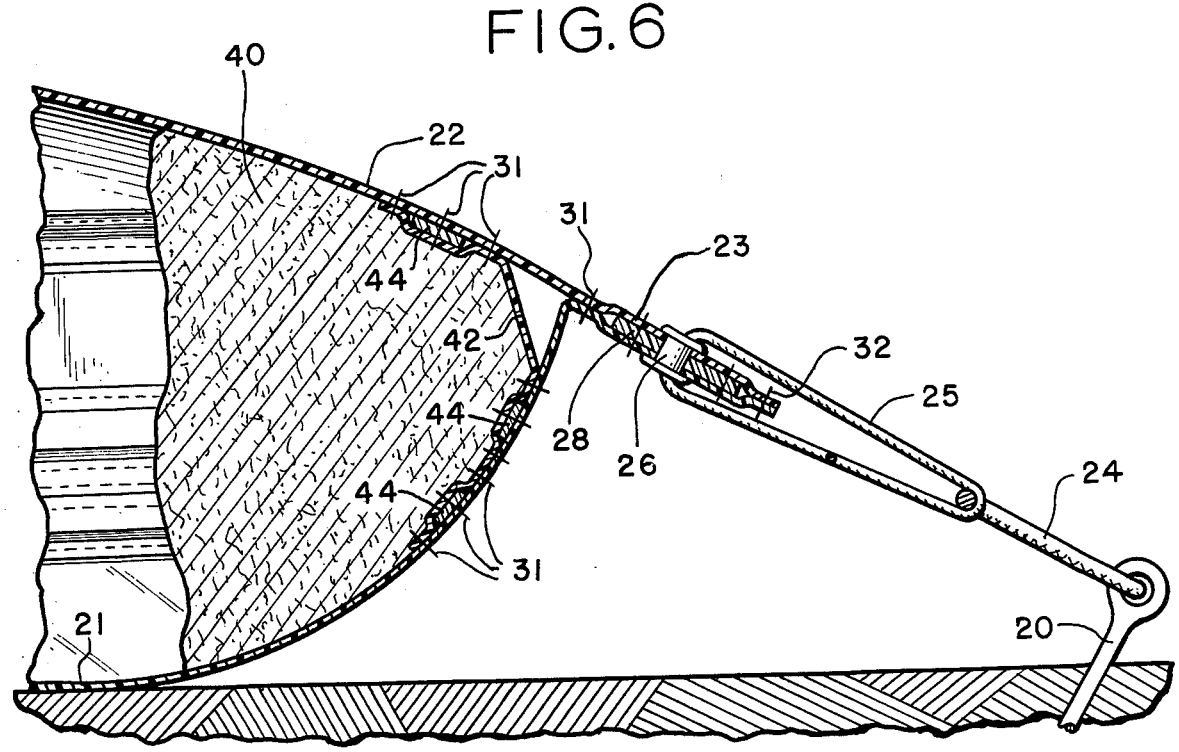
FIG. 6 is a partial side cross-sectional view of the storage apparatus of FIG. 5 taken across 6—6 and further illustrating the flexible membrane cover and the flexible membrane base, and means for lashing the cover and base to any suitable surface.

Referring to FIGS. 5 and 6, there is illustrated a modified storage apparatus embodying the features of the present invention and indicated generally by reference numeral 30. The storage apparatus 30 is formed by a base 21 and a cover 22, which have been joined so as to leave a lip 23. Base 21 is generally pan-shaped, while cover 22 is conical and designed to rest on dry material in bulk 40 which has attained a 20° to 25° angle of repose.

Because base 21 and cover 22 are both preferably constructed from a strong, inert synthetic membrane, such as a thermoplastic, base 21 cannot be used to support and secure the cover 22 to a surface. In order to secure the storage apparatus 30, anchors 20 are placed around the periphery of the base 21. The anchors 20 are preferably 24-inch shafts of ⅜-inch steel with a disc screw at the bottom edge of each anchor, and a holding strength of 2400 pounds in typical farmland.

As is illustrated in FIG. 6, reinforcement membrane 42 is attached to the inner surface of the base 21 and the cover 22. Reinforcement straps 44 are sealed between the cover 22 and reinforcement membrane 42, and between the base 21 and reinforcement membrane 42 by stitching 31. These reinforcement straps 44 carry some of the tensile forces exerted around the periphery of the base 21 and the cover 22. Reinforcement membrane 42 not only assists in joining cover 22 and base 21 near lip 23, but also provides additional strength for the cover 22 and base 21.

The cover 22 includes a closure means 50 extending along a diameter slit of the cover 22. The closure means 50 preferably comprises eyelets (not shown) in the cover 22 along the slit and a cable (not shown) laced through the eyelets. Other types of closure means, such as VELCRO strips attached along the slit and sliding or zipper fasteners are also acceptable.

Because the storage apparatus 30 relies on the dry material in bulk 40, as is illustrated in FIG. 6, to provide shape and partial support, at least the base 21 should preferably be filled with the dry material 40 before the storage apparatus 30 is secured to the surface. Additionally, a blower or fan can be used to impel air into storage apparatus 30 to provide shape and partial support while loading the storage apparatus 30. Filling the base 21 can be accomplished by piling the grain onto the base with an auger assembly 35 with the closure means 50 unfastened so that the cover 22 is open along a diameter slit. Blowers, shovels, or other conventional dry material moving devices can also be used to fill the base 21.

After the base 21 has been filled, cover 22 is laced shut along the closure means 50. The sleeve 34 which has been attached over an opening in the cover 22, is connected to an auger assembly 35 by a belt 36 and a band 37. The grain or other dry material is then fed into the storage apparatus 30 through the sleeve 34 by means of an auger assembly 35, preferably until the dry material reaches the level of the cover 22.

After the storage apparatus 30 has been filled to the desired capacity, the first cable 24 is threaded through the anchors 20 and around the periphery of the base 21 so as to make a full circuit. Periphery eyelets 26 are provided along the periphery of lip 23, and through the periphery strap 28, as shown in FIG. 6. The periphery strap 28 is secured inside the lip 23 by stitching 31. The second cable 25 is threaded alternately through the first eyelets 26 and around the first cable 24, thus securing the storage apparatus 30 to the anchored first cable 24.

Although storage apparatus 30 is illustrated as having a base 21 and cover 22, protection for the dry material in bulk 40 can be provided without the base 21. Cover 22 can be placed over an already-formed pile of dry material in bulk 40 and lashed to any suitable surface by using the lashing means described above and including the anchors 20, first cable 24, second cable 25, and periphery eyelets 23. Without the base 21, the auger assembly 35, sleeve 34, band 36 and belt 37 would not be required to form the pile of dry material in bulk 40. The base 21 is used when it is desirable to more fully protect the pile of dry material in bulk 40 from wind and rain, and particularly from surface liquids.

Acceptable cables, eyelets, and straps are provided of materials similar to those used in the storage apparatus 10 illustrated in FIGS. 1-4. The cover 22 is likewise fabricated from a thermoplastic membrane, preferably a urethane-coated spun polyester base fabric whose physical properties are listed in Table 2. Because it is desirable that the base 21 be able to protect the dry material from soil fungi, micro-organisms, acids, alkalis, salts, and the like, the base 21 is preferably made from a gas and liquid impermeable membrane, such as a polyvinyl chloride coated polyester reinforced membrane, with a weight of 18 ounces per square yard, and the following physical properties:

TABLE 3
PROPERTIES OF BASE MATERIAL

| | Physical Values | Test Methods |
|---|---|---|
| Tensile Strength | Warp 300 Fill 300 | ASTM D751 |
| Tear Strength | Warp 130 Fill 130 | ASTM D751 |
| Hydrostatic Resistance | 250 p.s.i. | ASTM D751 |
| Cold Resistance | −30° F. | ASTM D1790 |
| Flame Resistance | 7 seconds/ 1 sq. in. | CCCT 191b |
| Outdoor Exposure | 200 hours, weatherometer | ASTM D1499-59T |
| Volatility | .7% | ASTM D1203 |
| Coating Adhesion | 10 lb./ sq. in. | ASTM D751 |

It should be noted that the unique storage apparatus of this invention offers a number of heretofore unrealized advantages. For instance, according to the invention, grain or other dry material in bulk can be stored outdoors with a minimum of expense, while protecting the dry material from the surrounding environment. The apparatus of the invention is easily set up, taken down, and compactly stored when not in use, without the use of a skilled labor force. The cost of the apparatus is relatively inexpensive in comparison with silos and other more permanent structures. The ease with which the apparatus can be positioned and relocated makes it ideal for use on leased-land sites.

The cover and base of the storage apparatus 30 illustrated in FIGS. 5 and 6 are fabricated from a synthetic, flexible membrane material which can be easily assembled and readily sealed into a one-piece structure. The membrane material used in all embodiments of the invention is easily repaired with adhesives or tape.

Use of the storage apparatus 30 comprising a cover and a base of synthetic flexible membrane provides complete protection of the dry material in bulk not only from wind and rain, but also from seepage of liquids from below the dry material pile. Furthermore, the base is fabricated from a synthetic membrane which resists and protects the dry material from soil fungi, microorganisms, acids, alkalis and salts, thereby providing a smooth, contaminantfree surface on which the dry material rests.

The means for lashing the tarpaulin or cover to the anchors insures the adequate protection of the dry material and extends the usable lifetimes of the tarpaulin and cover materials. The use of a gas-permeable tarpaulin or cover permits aeration of the storage structure by vacuum or pressure blowers. Ventilation is alternatively achieved with pipe vents if the tarpaulin or cover is gas-impermeable. This aeration assists in drying the grain, which is usually stored with about a 15% moisture content, and serves to prevent vapor condensation so as to minimize the possibility of grain souring or spoiling due to unwanted germination, or mold, fungus, and micro-organism growth.

Of course, various other changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:
1. An improved storage apparatus of the type which includes a tarpaulin for covering a pile of dry material in bulk, wherein the improvement comprises:
   a plurality of anchors for the tarpaulin, said anchors so positioned as to encircle the pile of dry material at spaced intervals,
   a first cable attached to said anchors so as to define a circuit about the pile of dry material, and
   flexible means for attaching a peripheral edge of said tarpaulin to said first cable at spaced intervals along the circuit of said first cable whereby the length of said flexible attaching means adjusts in response to stress exerted upon the tarpaulin.

2. An improved storage apparatus of the type which includes means forming an open storage bin, and a tarpaulin for covering the storage bin, wherein the improvement comprises:
   a plurality of anchors for the tarpaulin, said anchors so positioned as to encircle the storage means at spaced intervals,
   a first cable attached to said anchors so as to define a circuit about the storage means, and
   flexible means for attaching a peripheral edge of the tarpaulin to said first cable at spaced intervals along the circuit of said first cable whereby the length of said flexible attaching means adjusts in response to stress exerted upon the tarpaulin.

3. An improved storage apparatus of the type which includes a wall forming an open storage bin and a tarpaulin for covering the storage bin, wherein the improvement comprises:
   a first cable attached to the periphery of the wall at a first plurality of locations, and
   flexible means for attaching a peripheral edge of the tarpaulin to said first cable at a second plurality of locations along the periphery of the wall whereby the length of said flexible attaching means adjusts in response to stress exerted upon the tarpaulin.

4. A storage apparatus for dry material in bulk comprising:
   means forming a covered storage container comprising a flexible membrane cover and a flexible membrane base, and
   stress responsive means for lashing said storage container to a surface, said lashing means comprising a plurality of eyelets at intervals on the periphery of the cover, a plurality fo anchors attached to the surface at intervals, said anchors so positioned as to encircle the covered storage container, a first cable sequentially connected to said anchors so as to define a circuit about the covered storage container, and a second cable alternately threaded freely through said eyelets and around said first cable along the circuit defined by said first cable.

5. The storage apparatus of claim 4 wherein the flexible membrane cover is conical and the flexible membrane base is pan-shaped.

6. The storage apparatus of claim 5 wherein the conical cover is provided with a closure means and a sleeve for inserting the dry material into the storage apparatus.

7. An improved storage apparatus of the type which includes means forming an open storage bin, and a tarpaulin for covering the storage bin, wherein the improvement comprises:
   a plurality of anchors for the tarpaulin, said anchors so positioned as to encircle the storage means at spaced intervals, a first cable attached to said anchors so as to define a circuit about the storage means, means for attaching a peripheral edge of the tarpaulin to said first cable at spaced intervals along the circuit of said first cable, and means for adjusting the shape and surface tension of the tarpaulin, said means comprising a pair of radial folds of the tarpaulin having straps inserted therein and eyelets in the straps and radial folds, and a cable threaded alternately through the eyelets of the radial folds.

8. An improved storage apparatus of the type which includes a wall forming an open storage bin and a tarpaulin for covering the storage bin, wherein the improvement comprises:

a first cable attached to the periphery of the wall at a first plurality of locations, means for attaching a peripheral edge of the tarpaulin to said first cable at a second plurality of locations along the periphery of the wall, and means for adjusting the shape and surface tension of the tarpaulin, said means comprising a pair of radial folds of the tarpaulin having straps inserted therein and eyelets in the straps and radial folds, and a cable threaded alternately through the eyelets of the radial folds.

9. An improved storage apparatus of the type which includes a tarpaulin for covering a pile of dry material in bulk, the peripheral edge of the tarpaulin having a plurality of eyelets at intervals, wherein the improvement comprises:

a plurality of anchors for the tarpaulin, said anchors so positioned as to encircle the pile of dry material at spaced intervals, a first cable attached to said anchors so as to define a circuit about the pile of dry material, and a second cable alternately freely threaded through the tarpaulin eyelets and around said first cable whereby a peripheral edge of the tarpaulin is attached to said first cable at spaced intervals along the circuit of said first cable.

10. An improved storage apparatus of the type which includes means forming an open storage bin, and a tarpaulin for covering the storage bin, the peripheral edge of the tarpaulin having a plurality of eyelets at intervals, wherein the improvement comprises:

a plurality of anchors for the tarpaulin, said anchors so positioned as to encircle the storage means at spaced intervals, a first cable attached to said anchors so as to define a circuit about the storage means, and a second cable alternately freely threaded through the tarpaulin eyelets and around said first cable whereby a peripheral edge of the tarpaulin is attached to said first cable at spaced intervals along the circuit of said first cable.

11. An improved storage apparatus of the type which includes a wall forming an open storage bin and a tarpaulin for covering the storage bin, the peripheral edge of the tarpaulin having a plurality of eyelets at intervals, wherein the improvement comprises:

a first cable attached to the periphery of the wall at a first plurality of locations, and a second cable alternately freely threaded through the tarpaulin eyelets and around said first cable whereby a peripheral edge of the tarpaulin is attached to said first cable at a second plurality of locations along the periphery of the wall.

* * * * *

UNITED STATES PATENT AND TRADEMARK OFFICE
CERTIFICATE OF CORRECTION

PATENT NO. : 4,084,358
DATED : April 18, 1978
INVENTOR(S) : Raymond S. Winters

It is certified that error appears in the above-identified patent and that said Letters Patent are hereby corrected as shown below:

Column 1, line 5, delete "rlates" and insert --relates-- therefor.
Column 1, line 21, delete "data" and insert --area-- therefor.
Column 2, line 49, delete "furter" and insert --further-- therefor.
Column 8, line 48, delete "fo" and insert --of-- therefor.

Signed and Sealed this

Twenty-ninth Day of August 1978

[SEAL]

Attest:

RUTH C. MASON
Attesting Officer

DONALD W. BANNER
Commissioner of Patents and Trademarks